United States Patent
Awada et al.

(10) Patent No.: US 7,523,386 B2
(45) Date of Patent: Apr. 21, 2009

(54) WORLD WIDE WEB DOCUMENT DISTRIBUTION SYSTEM WITH A PLURALITY OF ALTERNATE USER-INTERFACE FORMATS SELECTIVELY AVAILABLE FOR EACH BOOKMARKED WEB DOCUMENT

(75) Inventors: Faisal M. Awada, Round Rock, TX (US); Joe Nathan Brown, Austin, TX (US); Philip Bernard Burkes, Round Rock, TX (US); Victor Espinoza, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 10/660,072

(22) Filed: Sep. 11, 2003

(65) Prior Publication Data

US 2005/0060274 A1    Mar. 17, 2005

(51) Int. Cl.
*G06F 17/00* (2006.01)
*G06F 17/20* (2006.01)
(52) U.S. Cl. .................................................. 715/200
(58) Field of Classification Search ................. 715/500, 715/523, 534, 200
See application file for complete search history.

(56) References Cited

U.S. PATENT DOCUMENTS

| | | | | |
|---|---|---|---|---|
| 5,737,560 | A * | 4/1998 | Yohanan | 715/847 |
| 6,032,162 | A * | 2/2000 | Burke | 715/501.1 |
| 6,044,205 | A * | 3/2000 | Reed et al. | 709/201 |
| 6,223,178 | B1 | 4/2001 | Himmel et al. | 707/10 |
| 6,256,639 | B1 | 7/2001 | Himmel et al. | 707/104 |
| 6,393,462 | B1 | 5/2002 | Mullen-Schultz | 709/206 |
| 6,460,038 | B1 * | 10/2002 | Khan et al. | 707/10 |
| 6,725,227 | B1 * | 4/2004 | Li | 707/102 |
| 6,810,404 | B1 * | 10/2004 | Ferguson et al. | 707/200 |
| 2002/0078089 | A1 * | 6/2002 | Bade et al. | 707/513 |

(Continued)

FOREIGN PATENT DOCUMENTS

GB     2333617     7/1999

(Continued)

OTHER PUBLICATIONS

Abrams et al.; "Information Archiving with Bookmarks: Personal Web Space Construction and Organization"; 1998 ACM; pp. 42-48.*

(Continued)

*Primary Examiner*—Doug Hutton
*Assistant Examiner*—James J Debrow
(74) *Attorney, Agent, or Firm*—Jerry Kraft; Diana R. Gerhardt

(57) ABSTRACT

A user at a receiving Web station is provided with several alternate Web page display interface formats, from which the user may select the appropriate format for each Web document that he bookmarks. Thus, each time that a bookmarked Web document will be displayed subsequently, it will have this optimum presentation interface format. The implementation comprises bookmarking a received Web document, predetermining at least one display interface format alternate to said standard display interface format for bookmarked Web documents, providing a document folder associated with each alternate display interface format, enabling a user to put a bookmarked Web document into a document folder associated with an alternate display interface format and displaying bookmarked documents in said document folder in said alternate display interface format.

20 Claims, 7 Drawing Sheets

U.S. PATENT DOCUMENTS

2004/0205511 A1* 10/2004 Best et al. ................ 715/501.1
2005/0193053 A1*  9/2005 Kendall et al. .............. 709/200
2006/0218245 A1*  9/2006 Horn .......................... 709/218

OTHER PUBLICATIONS

Abrams et al.; "Information Archiving with Bookmarks: Personal Web Space Construction and Organization";1998;ACM.*

Ebina et al,"Fast Web by Using Updated Content Extraction and a Bookmark Facility",ACM, 2000, pp. 64-71.*
Kanawati et al., "A Multi-agent System for Collaborative Bookmarking", 2002, ACM, pp. 1137-1138.*
Ameto et al., "TopicShop: Enhanced Support for Evaluating and Organizing Collections of Web Sites", 2000, ACM, pp. 201-209.*
Jones et al., "Keeping Found Things Found on the Web", ACM, 2001, pp. 119-126.*

* cited by examiner

WORLD WIDE WEB DOCUMENT DISTRIBUTION SYSTEM WITH A PLURALITY OF ALTERNATE USER-INTERFACE FORMATS SELECTIVELY AVAILABLE FOR EACH BOOKMARKED WEB DOCUMENT

TECHNICAL FIELD

The present invention relates to computer managed communication networks, such as the World Wide Web (Web), and particularly to ease of use for the interactive user to access data from bookmarked Web documents.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web (the two terms are used interchangeably) related distribution of documents, media and programs. The convergence of the electronic entertainment and consumer industries with data processing exponentially accelerated the demand for wide ranging communications distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct links between pages and other documentation on the Web and a variety of related data sources that were at first text and then evolved into media, i.e. "hypermedia". This even further expanded the use of the Internet or Web. Although many Web pages are professionally designed and, thus, relatively efficient to use, there are still a great many Web pages that are poorly designed and, thus, may present a cumbersome and confusing display interface when presented to the receiving user on the standard Web browser display interfaces, e.g. GUIs (graphical user interfaces). Web browsers that have been available for over a decade as a Web document search and access tool have provided users with the means of bookmarking, i.e. saving the Web path to such documents for future reference. However, such bookmarked Web documents are presented to the receiving user in a standard all-purpose display interface that serves as a default interface. The receiving user may predetermine the values of the attributes that define this interface, and these will serve as the user's standard or default interface. Of course, as the user receives specific Web documents, he is free to change the attribute values from the default values for any specific document display. This is relatively inefficient and time consuming to do Web document by Web document.

On the other hand, the user may need to present different types of regularly accessed, i.e. bookmarked, Web documents in different formats. For example, the user may wish to view a newspaper Web page in a different format from his stock portfolio page or job related technical Web page. Consequently, there is a need to provide Web page users with the means for effectively displaying bookmarked Web documents in different interface formats.

SUMMARY OF THE PRESENT INVENTION

The present invention provides the user at a receiving Web station with several alternate Web page display interface formats from which the user may select the appropriate format for each Web document that he bookmarks. Thus, each time that a bookmarked Web document will be subsequently displayed, it will have this optimum presentation interface format. The invention uses the combination of means for bookmarking a received Web document, means for predetermining at least one display interface format alternate to said standard display interface format for bookmarked Web documents, means for providing a document folder associated with each alternate display interface format, means for enabling a user to put a bookmarked Web document into a document folder associated with an alternate display interface format and means for displaying bookmarked documents in said document folder in said alternate display interface format. The invention may also be set up to permit a user to simultaneously display the plurality of Web documents having the alternate formats in respective separate windows.

The invention also provides for further bookmarking a hyperlink in an already bookmarked Web document in a document folder associated with a particular alternate display interface format to thereby put the Web document accessed through this further bookmarked hyperlink into the document folder associated with the particular alternate display interface format so that this further bookmarked Web document may also be displayed in the same alternate display interface format.

The combination of the present invention may most effectively be implemented through a Web browser at the receiving Web station that will include the above-described combination of means for bookmarking a received Web document, means for predetermining at least one display interface format alternate to said standard display interface format for bookmarked Web documents, means for providing a document folder associated with each alternate display interface format, means for enabling a user to put a bookmarked Web document into a document folder associated with an alternate display interface format and means for displaying bookmarked documents in said document folder in said alternate display interface format. Where the invention also provides for further bookmarking a hyperlink in an already bookmarked Web document in a document folder, this further implementation will also be implemented in the Web browser.

The invention may further enable a user to put the same bookmarked Web document into a plurality of folders respectfully associated with a plurality of alternate display interface formats to thereby permit the user the option of displaying the Web document in a plurality of formats as desired.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
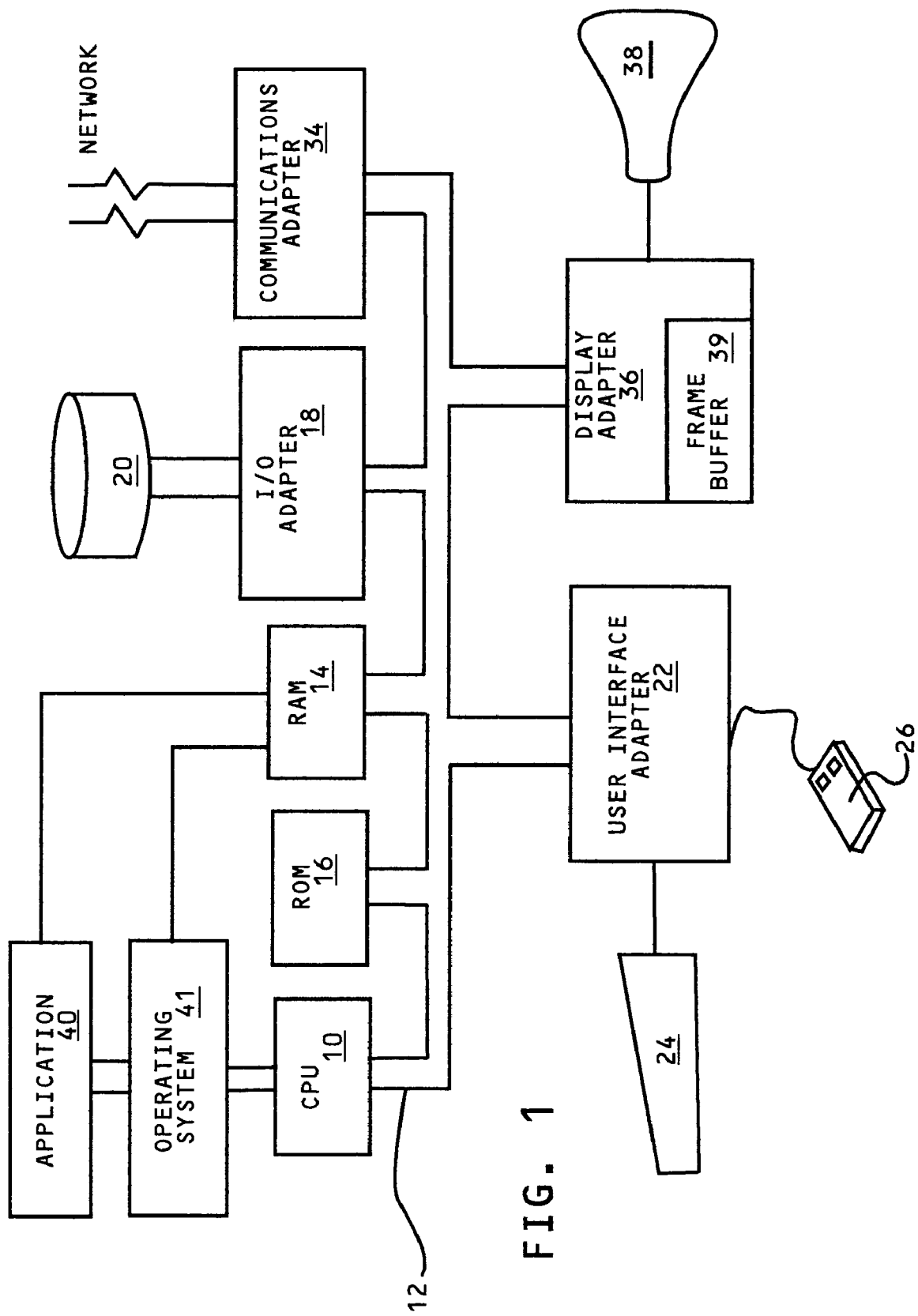
FIG. 1 is a block diagram of a data processing system including a central processing unit and network connections via a communications adapter that is capable of implementing the receiving display station on which the received Web page or Web document may be processed by bookmarking in accordance with the present invention.

Referring to FIG. 1, a typical data processing terminal is shown that may function as a basic computer controlled Web receiving terminal used in implementing the present invention for the bookmarking of received Web documents, with selected customized alternate display interfaces for bookmarked Web documents. A central processing unit (CPU) 10, such as one of the PC microprocessors or workstations, e.g. RISC System/6000™ series available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems such as IBM's AIX 6000™ operating system or Microsoft's Windows98™ or WindowsNT™, as well as UNIX and other IBM AIX operating systems. Application programs 40, controlled by the system, are moved into and out of the main memory Random Access Memory (RAM) 14. These programs include the programs of the present invention that will be described hereinafter in combination with any conventional Web browser at the receiving Web station, such as Netscape 3.0™ or Microsoft's Internet Explorer™. The program routines in applications 40 would be the programs involved in the provision of alternate customized display interfaces for bookmarked received Web documents. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs for bookmarking and selected alternate display interfaces for bookmarked documents at the receiving display terminal according to the present invention. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods that may be related to the present invention. Since a major aspect of the present invention is directed to documents, such as Web pages, transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996.

The Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. In this connection, the term "documents" is used to describe data transmitted over the Web or other networks and is intended to include Web pages with displayable text, graphics and other images. This displayable information may be still, in motion or animated, e.g. animated GIF images.

Web documents are conventionally implemented in HTML language, which is described in detail in the text entitled: *Just Java*, van der Linden, 1997, SunSoft Press, particularly at Chapter 7, pp. 249-268, dealing with the handling of Web pages; and also in the above-referenced *Mastering the Internet*, particularly at pp. 637-642, on HTML in the formation of Web pages. The images on the Web pages are implemented in a variety of image or graphic files such MPEG, JPEG or GIF files, which are described in the text, *Internet: The Complete Reference Millennium Edition*, Young et al., 1999, Osborne/McGraw-Hill, particularly at pp. 728-730.

In addition, aspects of this invention will involve Web browsers. A general and comprehensive description of browsers may be found in the above-mentioned *Mastering the Internet* text at pp. 291-313. More detailed browser descriptions may be found in the above-mentioned *Internet: The Complete Reference, Millennium Edition* text: Chapter 19, pp. 419-454, on the Netscape Navigator; Chapter 20, pp. 455-494, on the Microsoft Internet Explorer; and Chapter 21, pp. 495-512, covering Lynx, Opera and other browsers.

The invention involves the use of search engines for searching. As described in the above-mentioned *Internet: The Complete Reference, Millennium Edition* text, pages 395 and 522-535, search engines use keywords and phrases to query the Web for desired subject matter.

Figure 2:
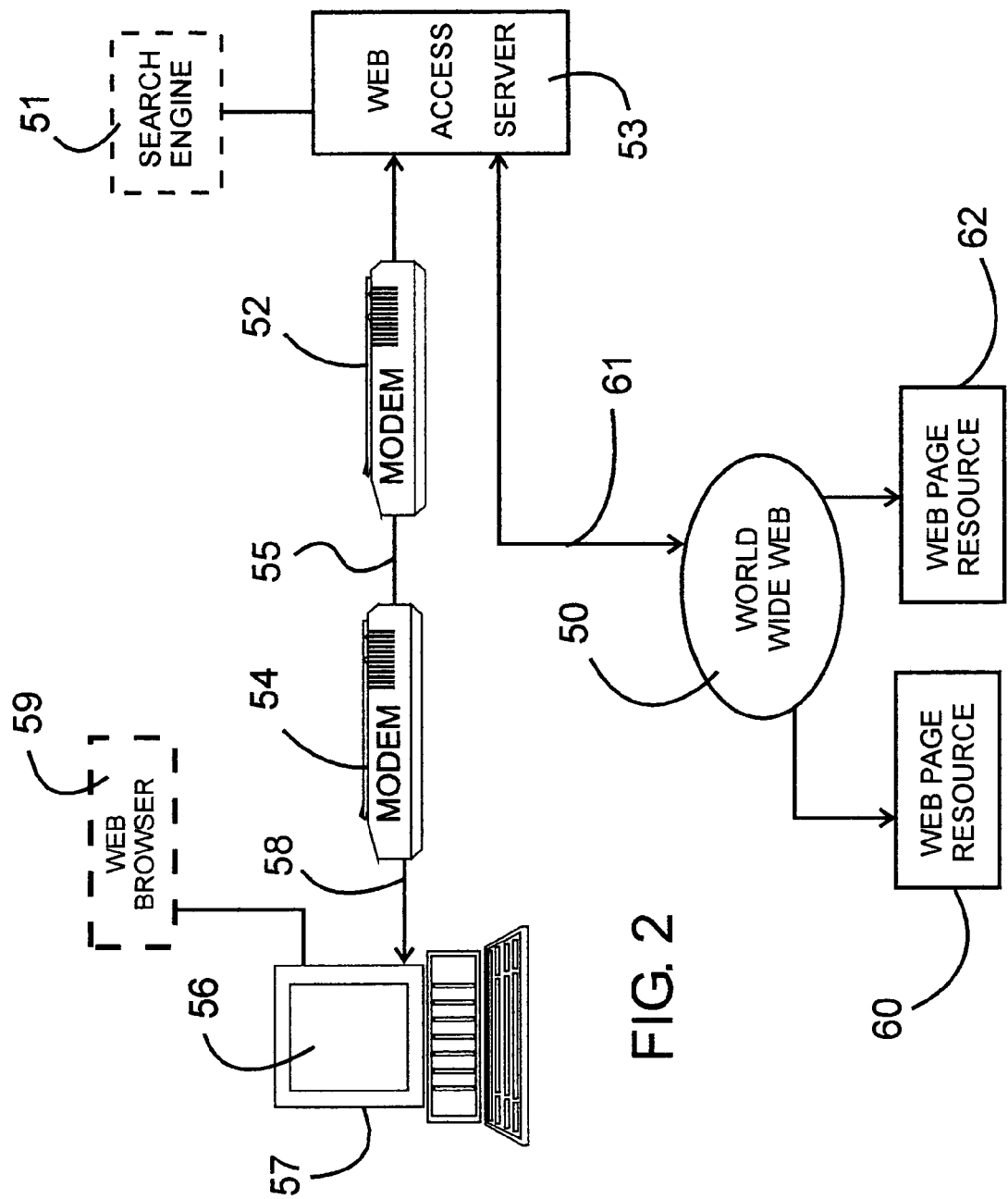
FIG. 2 is a generalized diagrammatic view of a Web portion upon which the present invention may be implemented.

A generalized diagram of a portion of the Web that the computer controlled display terminal 57 used for Web page receiving during searching or browsing is connected as shown in FIG. 2. Computer display terminal 57 may be implemented by the computer system set up in FIG. 1 and connection 58 (FIG. 2) is the network connection shown in FIG. 1. For purposes of the present embodiment, computer 57 serves as a Web display station and has received displayed Web page 56 that contains embedded hyperlinks to other Web pages.

Reference may be made to the above-mentioned *Mastering the Internet*, pp. 136-147, for typical connections between local display stations to the Web via network servers, any of which may be used to implement the system on which this invention is used. The system embodiment of FIG. 2 has a host-dial connection. Such host-dial connections have been in use for over 30 years through network access servers 53 that are linked 61 to the Web 50. The Web servers 53, which also may have the computer structure described with respect to FIG. 1, may be maintained by an ISP to the client's display terminal 57. The Web server 53 is accessed by the client terminal 57 through a normal dial-up telephone linkage 58 via modem 54, telephone line 55 and modem 52. Presently available high speed cable modems, as well as a variety of conventional wireless connections, may also be used to access the Web. The HTML file representative of the Web page 56 has been downloaded to display terminal 57 through Web access server 53 via the telephone line linkages from server 53, which may have accessed them from the Internet 50 via linkage 61. The Web browser program 59 operates within the display terminals 57 to control the communication with the Web access server 53 to thereby download and display the accessed Web pages 56 on terminal 57. The Web access server 53 uses one of the previously described search engines 51 to access via the Web 50 the desired sequence of Web pages from appropriate Web resources, such as databases 60 and 62. Web server 53 will carry out the functions of tracking and obtaining the bookmarked Web page that may be stored in association with the Web browser in a plurality of alternate customized display interface versions, as will hereinafter be described.

With this set up, the present invention, which will be described in greater detail with respect to FIGS. 3 through 5, may be carried out using Web browser 59 and associated Web server 53 (FIG. 2). Search engine 51 accesses the sequence of Web pages and provides such pages to the user at terminal 57 via Web browser 59 via server 53.

Figure 3:
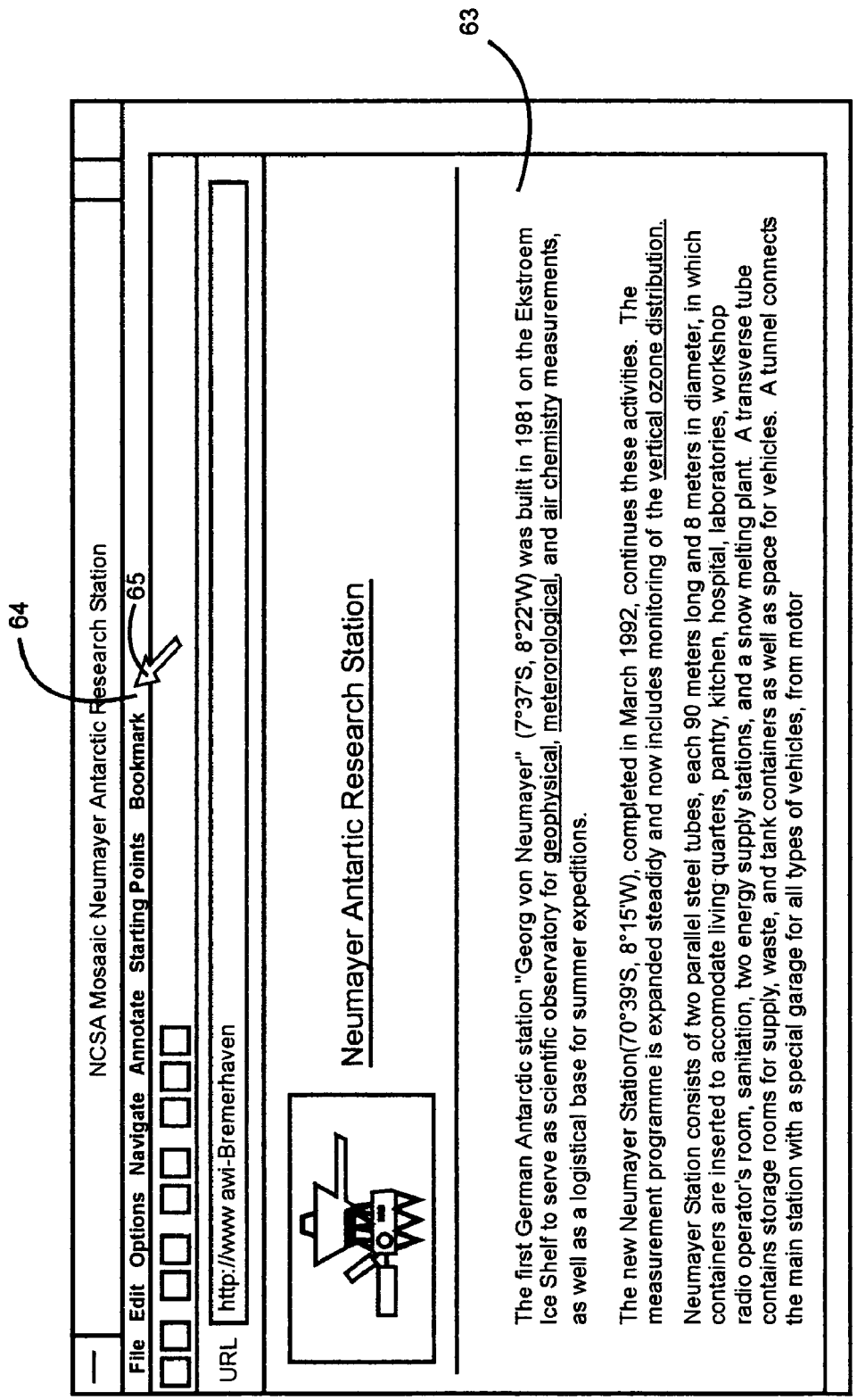
FIG. 3 is a diagrammatic illustration of a display screen showing an initial Web document that may be bookmarked in accordance with the present invention.
Figure 4:
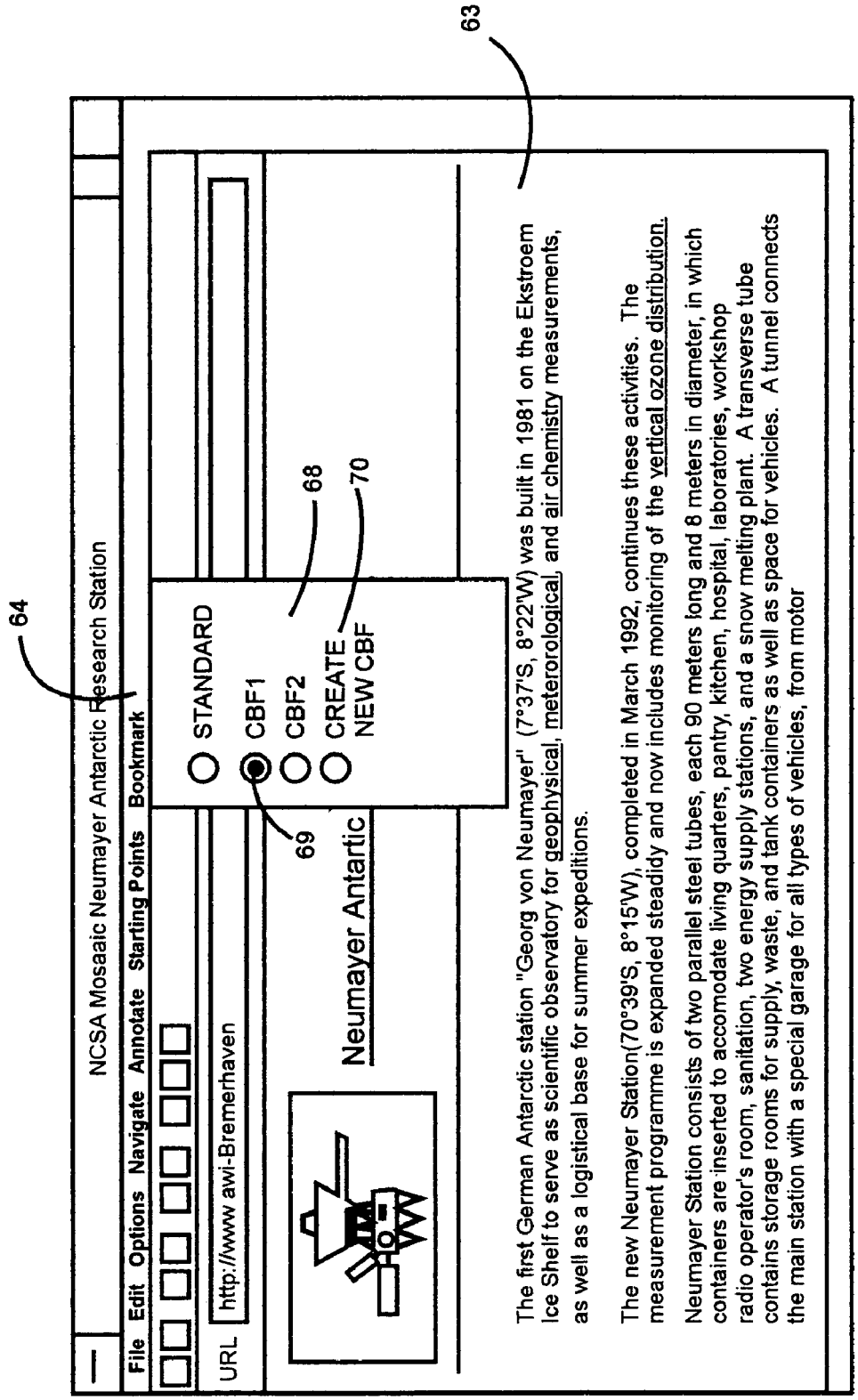
FIG. 4 is the display screen of FIG. 3 showing the dialog box that appears after the user has selected to bookmark through which the user may select standard bookmark interfaces or an alternate bookmark interface by selecting to put the bookmarked document.
Figure 5:
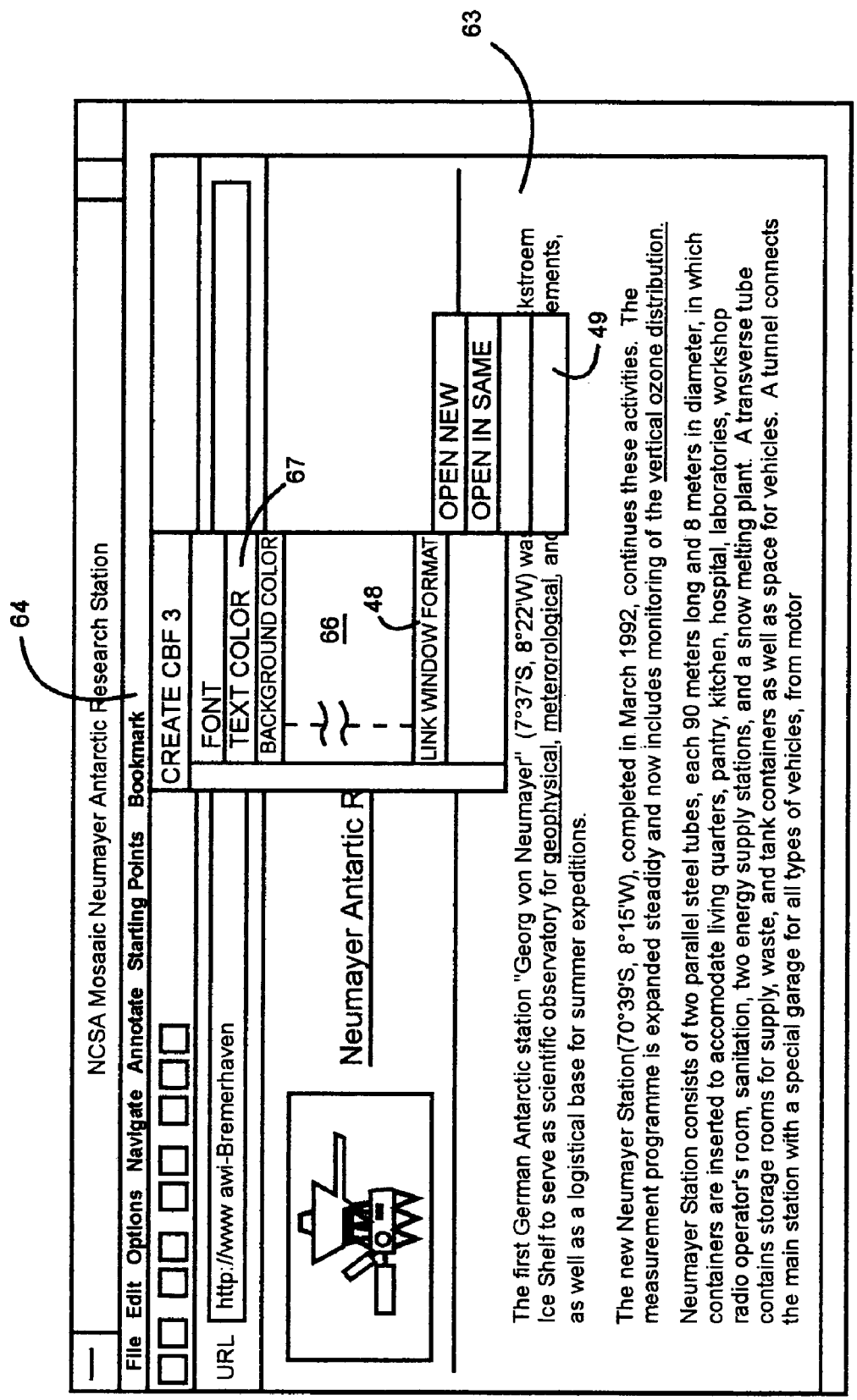
FIG. 5 is the display screen of FIG. 4 showing the dialog box that appears after the user has chosen to create a new customized bookmark folder.

Now, with respect to FIGS. 3 through 5, we will provide an illustrative example of how the present invention may be used to provide for customized alternate display interface versions of bookmarked Web documents. Web page 63, FIG. 3, is an illustration of the displayed Web page 56 in FIG. 2. This standard page contains text, graphics and images, as well as hyperlinks to other Web documents. It is displayed in a format that has been set as the standard or default display interface format in all Web documents that will be displayed unless an alternate display interface is selected for the Web document as follows. Let us assume that the user wishes to bookmark the Web document 63. He selects the bookmark button 64 with cursor 65. Drop down menu 68 appears, FIG. 4, and the user may select the standard interface. In such a case, the bookmarked Web document will display whenever accessed in the standard or default that has been previously determined by the Web browser for the display of Web documents. On the other hand, if the user wishes to display the Web page in an alternate format, in the present example, there are two alternate display interface formats that the user may choose, CBF1 or CBF2 (customized bookmarked folders 1 and 2). In the present example, the user has selected CBF2 69. As previously stated, each alternate display interface for a Web document is associated with a folder for which a set of interface format characteristics or properties and their values have already been predetermined, as will hereinafter be described.

All the user needs to do is to put the bookmarked Web document into the selected folder and the document would be displayed in the selected CBF folder interface. Of course, the user has the option of creating a new CBF by selecting item 70 in menu 68, FIG. 4. This will result in the interactive group of dialog cascading menus 66 and 49 shown in FIG. 5. Through the selection of items 67, the user may customize the CBF that he is creating to his specifications. In the example shown, the user has selected item 48 from menu 66 that has opened cascading menu 49. Once created, this CBF may be used for all subsequent bookmarked Web documents.

Figure 6:
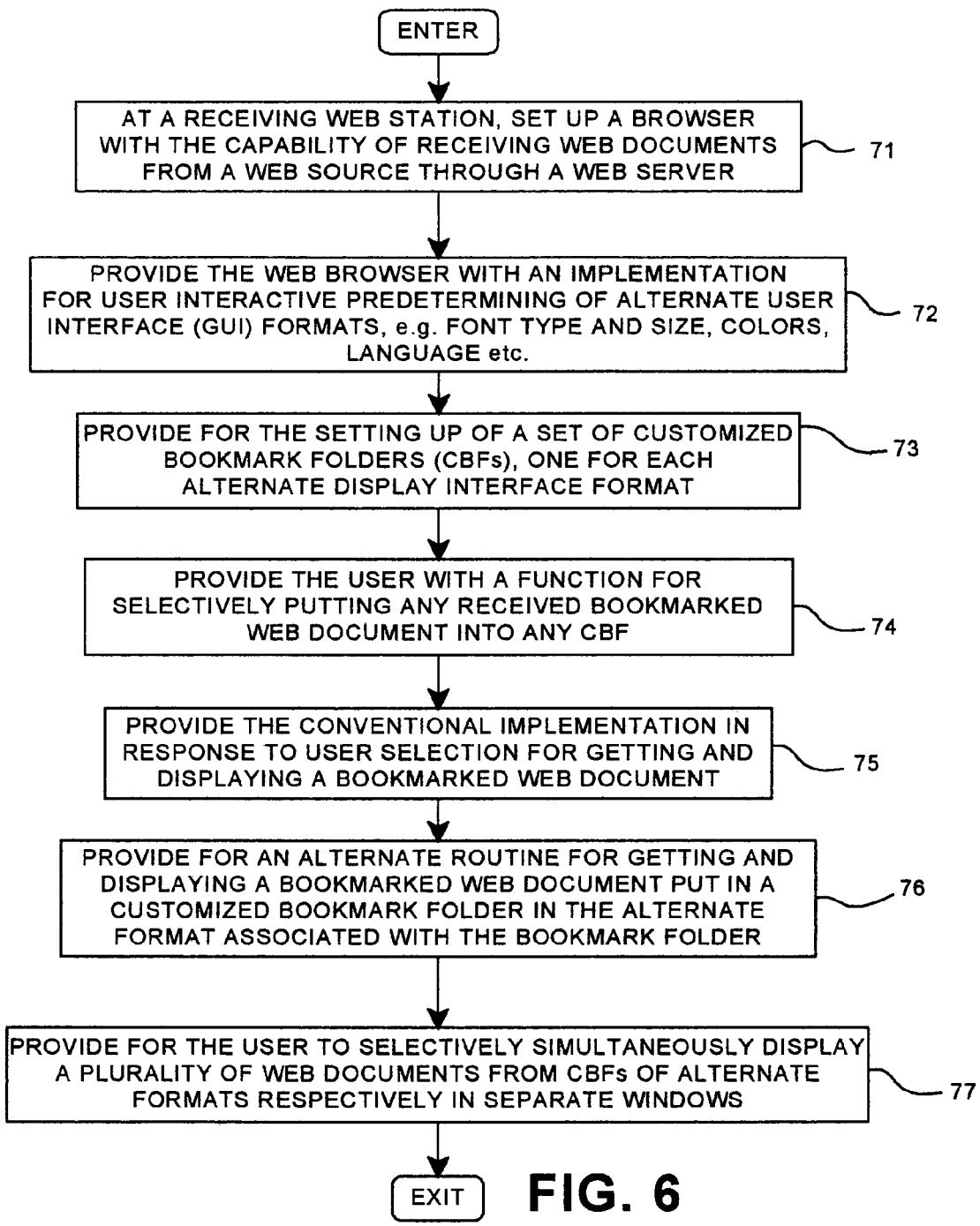
FIG. 6 is a general flowchart of a program set up to implement the present invention for providing alternate interfaces for bookmarked Web documents.

FIG. 6 is a flowchart showing the development of a process according to the present invention for creating and storing alternate display interface versions of user selected received Web pages. Most of the programming functions in the process of FIG. 6 have already been described in general with respect to FIGS. 3 through 6. A Web browser is provided at a receiving display station on the Web for accessing Web pages in the conventional manner and loading them at the display station, step 71. The Web pages are conventionally obtained via a Web server provided by an ISP. The Web browser has the capability of requesting searches from one or more search engines available through the Web. A process is provided to give the Web browser standard bookmarking capabilities, but, in addition, the browser is enabled to offer to the user the capability of creating and using alternate display interfaces with interface attributes different from the standard display interface provided by the Web browser for displaying the received Web pages or documents. Thus, step 72, the browser permits the user to predetermine alternate graphical user interface (GUI) formats, e.g. font type and size, colors, language etc. These alternate formats are each respectively embodied in each of a corresponding set of customized bookmark folders (CBFs), step 73. The user is provided with a function for putting any received bookmarked Web document into any CBF, step 74. The browser has a standard implementation wherein any fetched Web document will be displayed in the standard interface format, step 75, but an alternate routine is provided for getting and displaying a bookmarked Web document put into a CBF in the alternate display interface format associated with the selected CBF, step 76.

There is also provision for the user to select to have a plurality of Web documents from the CBFs of alternate formats simultaneously displayed in a plurality of separate windows, step 77.

Figure 7:
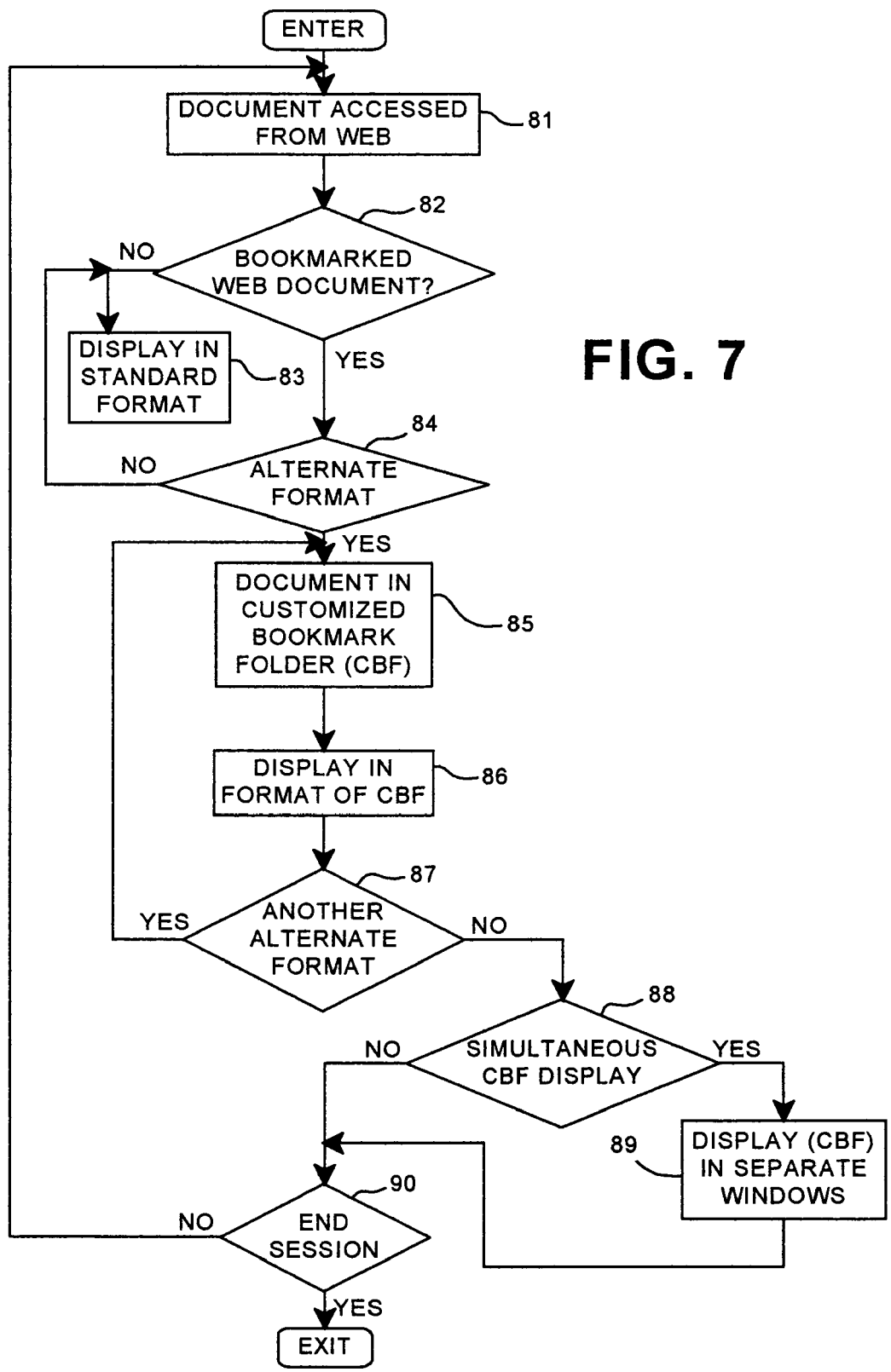
FIG. 7 is a flowchart of an illustrative run of the program set up in FIG. 6.

The running of the process set up in FIG. 6 and described in connection with FIGS. 3 through 5 will now be described with respect to the flowchart of FIG. 7. Let us assume that we are in a Web browsing session through the browser. The flowchart represents some steps in a routine that will illustrate the operation of the invention. The browser, via the ISP Web server, accesses the pages found by a search engine; the next Web document is accessed, step 81. A determination is made as to whether the user has bookmarked the page, step 82. If No, the accessed Web document is displayed in a standard format, step 83. If Yes, the document is bookmarked; then, step 84, an additional determination is made as to whether there is an alternate format for the bookmarked Web document, i.e. the document has been assigned to a CBF. If No, the document is displayed in a standard format, step 83. If Yes, the document's CBF is located, step 85, and the Web document is displayed in the CBF format, step 86. As set forth hereinabove, the user may have selected to have a bookmarked document stored in two different formats. Thus, at this point, a determination may be made as to whether the document has been stored in a different alternate format, step 87. If Yes, then the above document display routine is performed by returning the process to step 85 and the document's CBF is located, step 85, and the Web document is displayed in the other CBF format, step 86.

On the other hand, if in step 87, there is no other alternate format, the user has the option of simultaneously displaying several CBF bookmarked documents in their respective formats, step 88. If Yes, then the several Web documents are displayed simultaneously in their respective formats in separate windows, step 89. At this point or if the decision in step 88 had been No, a determination may conveniently be made as to whether the session is at an end, step 90. If Yes, it is exited. If No, the process is returned to initial step 81.

Although certain preferred embodiments have been shown and described, it will be understood that many changes and modifications may be made therein without departing from the scope and intent of the appended claims.

What is claimed is:

1. In a World Wide Web (Web) communication network with user access via a plurality of data processor controlled interactive receiving Web display stations for displaying, in a standard display interface format, received hypertext Web documents of at least one display page containing text and images accessible from sources on the Web and hyperlinks to other Web documents, a system for selectively customizing the standard display interface format of Web documents bookmarked at one of said receiving display stations, comprising:

means for bookmarking a received Web document;
   means for predetermining at least one alternate display interface format for said standard display interface format of said bookmarked Web documents;
   a document folder associated with each said alternate display interface format, each said document folder providing each of said bookmarked Web documents put into said document folder with a set of predetermined characteristics and values defining said alternate display interface format;
   means, responsive to said bookmarking means, for enabling a user to put each said bookmarked Web documents into the document folder associated with the corresponding alternate display interface format; and
   means for displaying the bookmarked documents in each said document folder in said corresponding alternate display interface format.

2. The Web system of claim 1 further including:
   means for further bookmarking a hyperlink in a bookmarked Web document in a document folder associated with an alternate display interface format; and
   means, responsive to said means for further bookmarking said hyperlink, for putting a Web document, accessed through said further bookmarked hyperlink, into the document folder associated with said alternate display interface format, wherein said further bookmarked Web document, accessed through said further bookmarked hyperlink, may also be displayed in same said alternate display interface format as the corresponding document folder.

3. The Web system of claim 1 further comprising:
   Web browsing means at said receiving display station including:
   said means for bookmarking a received Web document;
   said means for predetermining at least one alternate display interface format for said standard display interface format of said bookmarked Web documents;
   said document folder associated with each said alternate display interface format;
   said means for enabling a user to put each said bookmarked Web documents into the document folder associated with the corresponding alternate display interface format; and
   said means for displaying the bookmarked documents in each said document folder in said corresponding alternate display interface format.

4. The Web system of claim 3 wherein said browsing means further comprise:
   means for further bookmarking a hyperlink in a bookmarked Web document in a document folder associated with an alternate display interface format; and
   means, responsive to said means for further bookmarking said hyperlink, for putting a Web document, accessed through said further bookmarked hyperlink, into the document folder associated with said alternate display interface format, wherein said further bookmarked Web document, accessed through said further bookmarked hyperlink, may also be displayed in said same said alternate display interface format as the corresponding document folder.

5. The Web system of claim 1 wherein said means for predetermining, further provides a plurality of said alternate display interface formats; and
   further including a document folder associated with each of said alternate display interface formats.

6. The Web system of claim 5 wherein said means for enabling a user to put each said bookmarked Web documents into the document folder, further permits the user to put each said bookmarked Web documents into a plurality of document folders respectfully associated with a plurality of said alternate display interface formats.

7. The Web system of claim 5 wherein said means for displaying, simultaneously displays said plurality of bookmarked Web documents having said alternate formats in respective separate windows.

8. In a World Wide Web (Web) communication network with user access via a plurality of data processor controlled interactive receiving Web display stations for displaying, in a standard display interface format, received hypertext Web documents of at least one display page containing text and images accessible from sources on the Web and hyperlinks to other Web documents, a method for selectively customizing the standard display interface format of Web documents bookmarked at one of said receiving display stations, comprising:
   bookmarking a received Web document;
   predetermining at least one alternate display interface format for said standard display interface format of said bookmarked Web documents;
   providing a document folder associated with each said alternate display interface format, each said document folder providing each of said bookmarked Web documents put into said document folder with a set of predetermined characteristics and values defining said alternate display interface format;
   enabling a user to put each said bookmarked Web documents into the document folder associated with an alternate display interface format; and
   displaying the bookmarked documents in each said document folder in said corresponding alternate display interface format.

9. The method of claim 8 further including the steps of:
   further, bookmarking a hyperlink in a bookmarked Web document in a document folder associated with an alternate display interface format; and
   putting a Web document, accessed through said further bookmarked hyperlink, into the document folder associated with said alternate display interface format, wherein said further bookmarked Web document, accessed through said further bookmarked hyperlink, may also be displayed in same said alternate display interface format as the corresponding document folder.

10. The method of claim 8 further comprising:
a Web browsing process at said receiving display station including said steps of:
bookmarking a received Web document;
predetermining at least one alternate display interface format for said standard display interface format of said bookmarked Web documents;
providing a document folder associated with each said alternate display interface format;
enabling a user to put each said bookmarked Web documents into the document folder associated with the corresponding alternate display interface format; and
displaying the bookmarked documents in each said document folder in said corresponding alternate display interface format.

11. The Web method of claim 10 wherein said Web browsing process further comprises said steps of:
further bookmarking a hyperlink in a bookmarked Web document in a document folder associated with an alternate display interface format; and
putting a Web document, accessed through said further bookmarked hyperlink, into the document folder associated with said alternate display interface format, wherein said further bookmarked Web document, accessed through said further bookmarked hyperlink, may also be displayed in said same said alternate display interface format as the corresponding document folder.

12. The method of claim 8 wherein said step of predetermining, further provides a plurality of said alternate display interface formats; and
said step of providing, further respectively provides a document folder associated with each of said alternate display interface formats.

13. The method of claim 12 wherein said step of enabling a user to put each said bookmarked Web s into the document folder permits the user to put each said bookmarked Web documents into a plurality of document folders respectfully associated with a plurality of said alternate display interface formats.

14. The method of claim 12 wherein said step of displaying, simultaneously displays said plurality of bookmarked Web documents having said alternate formats in respective separate windows.

15. A computer readable medium having stored thereon, a computer program for selectively customizing the standard display interface format of Web documents bookmarked at a receiving Web display station in a World Wide Web (Web) communication network with user access via a plurality of data processor controlled interactive receiving Web display stations for displaying, in a standard display interface format, received hypertext Web documents of at least one display page containing text and images accessible from sources on the Web and hyperlinks to other Web documents, wherein the computer program when executed on a computer causes the computer to:
bookmark a received Web document;
predetermine at least one alternate display interface format for said standard display interface format of said bookmarked Web documents;
provide a document folder associated with each said alternate display interface format, each said document folder providing each of said bookmarked Web documents put into said document folder with a set of predetermined characteristics and values defining said alternate display interface format;
enable a user to put each said bookmarked Web documents into the document folder associated with an alternate display interface format; and
display the bookmarked documents in each said document folder in said corresponding alternate display interface format.

16. The computer readable medium of claim 15, wherein said computer program when executed causes the computer to:
further bookmark a hyperlink in a bookmarked Web document in a document folder associated with an alternate 6 display interface format; and
put a Web document, accessed through said further bookmarked hyperlink, into the document folder associated with said alternate display interface format, wherein said further bookmarked Web document, accessed through said further bookmarked hyperlink, may also be displayed in said same said alternate display interface format as the corresponding document folder.

17. The computer readable medium of claim 15 wherein said stored computer program includes a Web browser program at said receiving display station, wherein said browser program when executed causes the computer to:
bookmark a received Web document;
predetermine at least one alternate display interface format for said standard display interface format for bookmarked Web documents;
provide a document folder associated with each said alternate display interface format;
enable a user to put each said bookmarked Web documents into the document folder associated with an alternate display interface format; and
display the bookmarked documents in each said document folder in said corresponding alternate display interface format.

18. The computer readable medium of claim 17 wherein said Web browser program when executed causes the computer to:
further bookmark a hyperlink in a bookmarked Web document in a document folder associated with an alternate display interface format; and
put a Web documents, accessed through said further bookmarked hyperlink, into the document folder associated with said alternate display interface format, wherein said further bookmarked Web document, accessed through said further bookmarked hyperlink, may also be displayed in said same said alternate display interface format as the corresponding document folder.

19. The computer readable medium of claim 15 wherein the computer program when executed:
provides a plurality of said alternate display interface formats; and
provides a document folder associated with each of said respective alternate display interface formats.

20. The computer readable medium of claim 19 wherein the computer program when executed, simultaneously displays said plurality of bookmarked Web documents having said alternate formats in respective separate windows.

* * * * *